(12) United States Patent
Wüllrich et al.

(10) Patent No.: US 10,173,508 B2
(45) Date of Patent: Jan. 8, 2019

(54) TOP OF A CONVERTIBLE VEHICLE COMPRISING PANEL BOWS

(71) Applicant: Webasto SE, Stockdorf (DE)

(72) Inventors: Heinrich Wüllrich, Stockdorf (DE); Magnus Sviberg, Stockdorf (DE); Franz Haberl, Stockdorf (DE); Alexander Haimerl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/584,949

(22) Filed: May 2, 2017

(65) Prior Publication Data

US 2017/0334276 A1 Nov. 23, 2017

(30) Foreign Application Priority Data

May 17, 2016 (DE) .................. 10 2016 109 057
Feb. 9, 2017 (DE) .................. 10 2017 102 598

(51) Int. Cl.
*B60J 7/14* (2006.01)
*B60J 7/12* (2006.01)

(52) U.S. Cl.
CPC .................. *B60J 7/145* (2013.01); *B60J 7/12* (2013.01); *B60J 7/1204* (2013.01); *B60J 7/143* (2013.01)

(58) Field of Classification Search
CPC ............... B60J 7/12; B60J 7/143; B60J 7/145
USPC .............................................. 296/107.09, 108
See application file for complete search history.

(56) References Cited

U.S. PATENT DOCUMENTS 7,344,180 B2 * 3/2008 Halbweiss ............. B60J 1/1823
296/107.01
9,238,401 B2 * 1/2016 Willard .................. B60J 7/1247

* cited by examiner

*Primary Examiner* — Pinel E Romain
(74) *Attorney, Agent, or Firm* — Fitch, Even, Tabin & Flannery, LLP (57) ABSTRACT

A top of a convertible vehicle is proposed, comprising a top cover and a top linkage which can be displaced between a closed position, in which a vehicle interior is covered, and a storage position, in which the vehicle interior is open toward the top, and which has a linkage arrangement on both sides with respect to a vertical longitudinal center plane of the top, each linkage arrangement comprising two main links, which are pivotably mounted on a main bearing fixed to the vehicle and one of which is driven by means of a main drive. Panel bows extend between the bilaterally arranged linkage arrangements, a first one of said panel bows being a front bow, a second one being a front center bow, a third one being a rear center bow and a fourth one being a rear window bow. In the storage position, the rear center bow is arranged below the rear window bow.

23 Claims, 8 Drawing Sheets

TOP OF A CONVERTIBLE VEHICLE COMPRISING PANEL BOWS

CROSS-REFERENCE TO RELATED APPLICATIONS

This application claims priority from German Application Nos. 10 2016 109 057.3 and 10 2017 102 598.7, filed May 17, 2016 and Feb. 9, 2017, respectively, which are hereby incorporated herein by reference in their entirety for all purposes.

FIELD

The invention relates to a top of a convertible vehicle having the features of the preamble of claim 1.

BACKGROUND

A top of this kind is known from practice and is realized as a so-called panel-bow top, in which a top cover is stretched over so-called panel bows when the top is in the closed position, in which it covers a vehicle interior, said panel bows forming a largely continuous support surface for the top cover in the longitudinal direction of the vehicle. This means that the panel bows are panel elements that extend both in the transverse direction and in the longitudinal direction of the top. They are part of a top linkage which can be displaced between the closed position, in which the vehicle interior is covered, and a storage position, in which the vehicle interior is open toward the top, and which has a linkage arrangement on both sides with respect to a vertical longitudinal center plane of the top. The linkage arrangements, which substantially extend in the longitudinal direction of the top, each comprise a main multi joint arrangement having two main links, which are pivotably mounted on a respective main bearing, which is fixed to the vehicle. The panel bows are arranged between the two linkage arrangements. One of the panel bows forms a front bow, which can be fixed to a front header of the vehicle in question when the top is in the closed position. In the direction of the vehicle rear, the front bow is followed by the other panel bows, namely a front center bow, a rear center bow and a rear window bow, which accommodates a rear window.

In known panel-bow tops of the kind described above, the panel bows have a stacked order when the top is in the storage position, first the front bow, then the front center bow, then the rear center bow and, at the bottom, the rear window bow being arranged from top to bottom in said stacked order. This is not ideal in terms of package because unused space will remain below the rear window bow.

The object of the invention is to provide a top of the kind mentioned above that is optimized in terms of package in the storage position.

SUMMARY

This object is attained according to the invention by the enclosed embodiments of a top.

In the top according to the invention, the rear center bow is arranged below the rear window bow when the top is in the storage position. Thus, the structural space used by the top in the storage position can be ideally exploited in the vertical direction of the vehicle because the rear window bow, i.e. the panel bow that accommodates a rear window of the top, will accommodate the rear center bow in its curvature at the bottom. Two displacing links are articulated to the center bow, one of which is driven by means of a drive element and preferably one of which is pivotably mounted on the main bearing. The drive element triggers a pivoting motion of the two displacing links, whereby the rear center bow can be displaced in the rear direction and be placed under the rear window bow. The drive element can be a separate drive element or the main drive, by means of which one of the main links of the linkage arrangement in question is driven.

The top according to the invention is a so-called panel-bow top, in which the top cover is supported across at least largely the entire surface in the longitudinal direction when the top is in the closed position. Larger gaps between the panel bows are not necessary and are not formed, either.

The top cover is typically not fixed to the rear center bow. Hence, it is unnecessary in case of the top according to the invention to reserve structural space for a potential fabric fold between the rear window bow and the rear center bow.

Within the meaning of the present invention, a driven link is a link that is subjected, either directly or via a transmission or a drive link arrangement, to a displacing force by a drive means, such as a hydraulic cylinder or an electric motor. They are different from passively driven links, which are not located within the force chain emanating from the drive means but are pivoted along with a driven link being pivoted.

In a special embodiment of the top according to the invention, a coupling lever is provided which is connected to the drive element and to which a drive lever for the driven displacing link of the rear center bow and a lowering lever are articulated, which is connected to the driven main link. In this case, the main drive and the drive element for the displacing links are formed by the same drive means.

The coupling link, which is part of a drive link arrangement for the driven displacing link and part of a drive link arrangement for the driven main link, is advantageously pivotably mounted on the main bearing so that its position and its pivoting behavior are defined.

To be able to ideally utilize the limited structural space in a top of a convertible vehicle, it may be advantageous for one of the displacing links for the rear center bow to be pivotably supported on one of the main links via a hinge point.

In a special embodiment of the top according to the invention, it may be required for the rear window bow to be lifted before the rear center bow is pivoted. In this case, the rear window bow can be connected to a respective drive means on both sides via a respective rear window link arrangement so that when the top is being displaced from the closed position into the open position, the rear window bow undergoes a lifting motion first, followed by a displacing motion of the rear center bow under the rear window bow caused by the main drives or by separate drive elements. The drive means for the rear window bow can also be formed by a separate drive means or by a drive means that forms the main drive for the driven main link.

The invention also relates to a top of a convertible vehicle having the features of claim 6.

In this panel-bow top, a tension bow is arranged between the bilaterally arranged linkage arrangements, said tension bow limiting the top cover at the rear in the closed position and being displaceable between a lowered position and a lifted position by means of a tension rod arrangement. The tension rod arrangement is connected to an actuating link, which can be driven by a drive means and is connected to a rear window link arrangement via a coupling link. By means of the actuating link, the rear window bow undergoes a displacing motion in the direction of the tension bow when the top is being displaced from the closed position into the storage position. When the top is being lowered into a storage box of the vehicle in question, the rear window bow can thus be brought to the height at which the tension bow is located when the top is the storage position. In this way, the structural space available within a vehicle can be ideally utilized.

In a special embodiment, the rear window link arrangement, which is arranged on both sides with respect to the longitudinal center plane of the top, has a front folding lever and a rear folding lever. The two folding levers, each of which is formed by two lever elements pivotable relative to each other, are supported on the tension rod arrangement or on the tension bow on one side and are articulated to the rear window bow on the other side. When the rear window bow is being displaced in the direction of the tension bow, the folding levers will be displaced from their stretched position into a tilted position. In order to define the folding behavior of the two folding levers, they are preferably connected via a steering rod, which is articulated to one of the folding levers via a fixed revolute joint and to the other folding lever via a long-hole arrangement.

It may be necessary for the position of the pivot axis of the tension bow to be displaced during displacement of the top. For this purpose, in a special embodiment of the top according to the invention, the tension bow is articulated to a steering link on both sides, each steering link being connected to a drive lever driven by the drive means for the actuating link.

In another embodiment of the top according to the invention, a roof rear link is articulated to the tension bow or to the steering link, the roof rear link being connected via a hinge point to a coupling rod for actuating the front bow, and a rear-side weather-strip section of a side weather strip of the top being preferably fixed to the roof rear link. Thus, it is no longer necessary to fix the respective weather-strip section to one of the main links. Instead, the roof rear link, too, can be lifted when the tension bow is actuated, which, in turn, has the effect that the tension bow itself does not have to be pivoted as far in order to clear the space required to open a customary top storage box lid. In fact, the time required to open or close the top can even be reduced.

The main drive and the drive means for the tension rod arrangement can be formed by separate control elements, such as hydraulic cylinders or electric motors. However, integrating the main drive and the drive means in a shared control element by corresponding conception is contemplated as well.

To achieve a defined displacing motion when actuating the top linkage, the main drive and the drive means for the tension rod arrangement are actuated successively in a preferred embodiment of the top according to the invention. This means that starting from the closed position or stretched position, first the tension bow is lifted together with the rear window bow and subsequently the other panel bows are actuated by actuating the main drive so as to arrive at the storage position. In doing so, the rear center bow is displaced under the rear window bow, whereas the front center bow and the front bow come to rest above the rear window bow in the storage position.

Furthermore, the invention relates to a top having the features of claim 13. In this top, in which the front bow is connected to a roof center link via two front links, the roof center link being connected to the two main links in an articulated manner, the front center bow is pivotably mounted on one of the front bows and connected to a drive lever which is articulated to the front bow via a hinge point. The position of the front center bow, i.e. its pivoted position, is consequently defined by the position of the front bow during displacement of the top.

Furthermore, the invention relates to a top having the features of claim 14. This convertible top comprises a top cover and a top linkage which can be displaced between a closed position, in which a vehicle interior is covered, and a storage position, in which the vehicle interior is open toward the top. Furthermore, the top linkage comprises a rear-side tension bow, which limits the top cover at the rear in the closed position, and a linkage arrangement on both sides with respect to a vertical longitudinal center plane of the top, each linkage arrangement comprising two main links, which are pivotably mounted on a main bearing fixed to the vehicle and one of which is driven by means of a main drive, and a side weather strip of the top, which cooperates with a lateral window arrangement of the convertible vehicle in the closed position. The side weather strip of the top has at least one rear-side weather-strip section which is attached to a weather-strip link of the respective linkage arrangement. The weather-strip link undergoes a lifting motion together with the tension bow when the top linkage is being displaced from the closed position into the storage position. The tension bow, which is typically mounted pivotably so that a rear-side top storage box of the vehicle in question can be opened, can thus be pivoted upward when the weather-strip link is in the lifted position, thus minimizing the risk that components of the top, in particular cross bows or a rear window, may affect the head clearance of vehicle passengers or intrude into the area where the vehicle passengers' heads would be located. The vehicle passengers' safety is thus significantly increased as compared to solutions in which the tension bow and the weather-strip link do not undergo an additional lifting motion prior to pivoting and during pivoting of the tension bow.

In a special embodiment of this top, the weather-strip link is a roof rear link that is articulated via its front-side end to a coupling rod for actuating a front bow. The lifting motion that the weather-strip link will undergo is an upward pivoting motion via the revolute joint of the weather-strip link on the coupling rod.

Advantageously, the tension bow is articulated to the bilaterally arranged weather-strip links. Thus, a lifting force exerted on the weather-strip link can also be transmitted directly to the tension bow.

In a special embodiment of the top according to the invention, the lifting motion of the weather strip-link and of the tension bow is triggered on both sides by means of a respective steering link. The latter is in particular articulated to the weather-strip link.

For being driven, the steering link can be connected to a drive lever that is driven by a drive means and preferably pivotably mounted on the main bearing fixed to the vehicle.

In order to integrate functions and to keep the number of drive levers small, an actuating link can further be articulated to the drive lever, said actuating link being connected to a tension rod arrangement by means of which the tension bow can be pivoted in relation to the weather-strip link. The drive lever thus triggers the lifting motion of the tension bow and of the weather-strip link, on the one hand, and causes the tension bow to be pivoted in relation to the weather-strip link by driving the actuating link and the tension rod arrangement, on the other hand, a top storage box lid thus being pivotable, by means of which the top storage box of the vehicle in question can be closed.

The actuating link for actuating the tension rod arrangement can be articulated to the drive lever directly or indirectly via a control-lever arrangement.

To be able to define a structured sequence of motions during displacement of the top, the main drive and the drive means are preferably formed by separate control elements that can be controlled in a desired sequence by a top control.

The top comprising the weather-strip links that can be lifted can be a panel-bow top that has multiple panel bows, for instance four panel bows, of which a first one is a front bow, a second one is a front center bow, a third one is a rear center bow and a fourth one is a rear window bow. In an alternative embodiment, the top is realized as a tension bow top, in which the top cover is kept under tension between the tension bow and the front bow by means of customary cross bows.

Other advantages and advantageous embodiments of the subject-matter of the invention are apparent from the description, the drawing and the claims.

An embodiment of the top according to the invention is illustrated in the drawing in a schematically simplified manner and will be explained in more detail in the following description. In the drawing:

DETAILED DESCRIPTION

Figure 1:
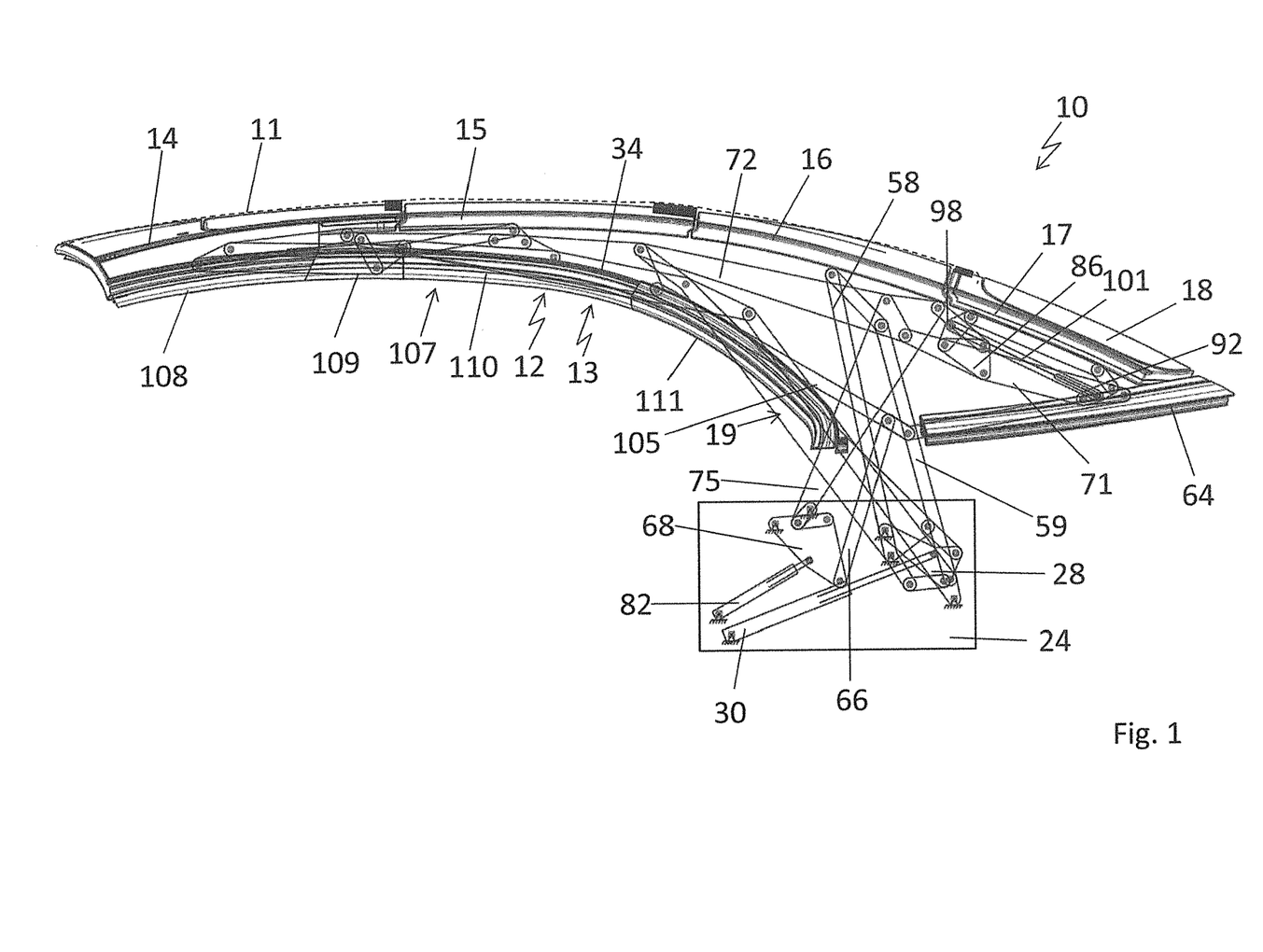
FIG. 1 shows a schematic side view of a top according to the invention in its closed position.
Figure 2:
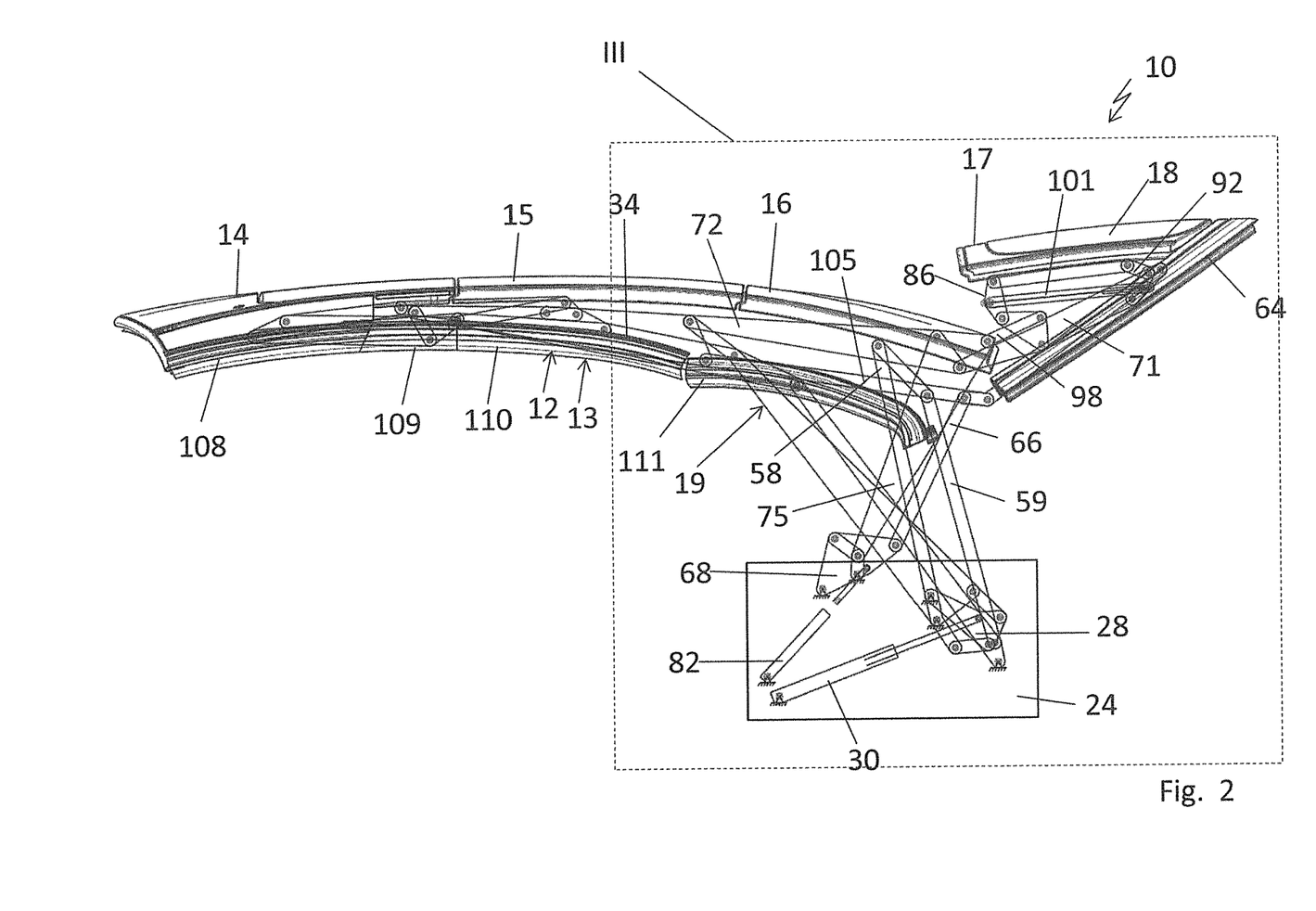
FIG. 2 shows a schematic side view of the top according to FIG. 1 in a first intermediate position during displacement into a storage position.
Figure 3:
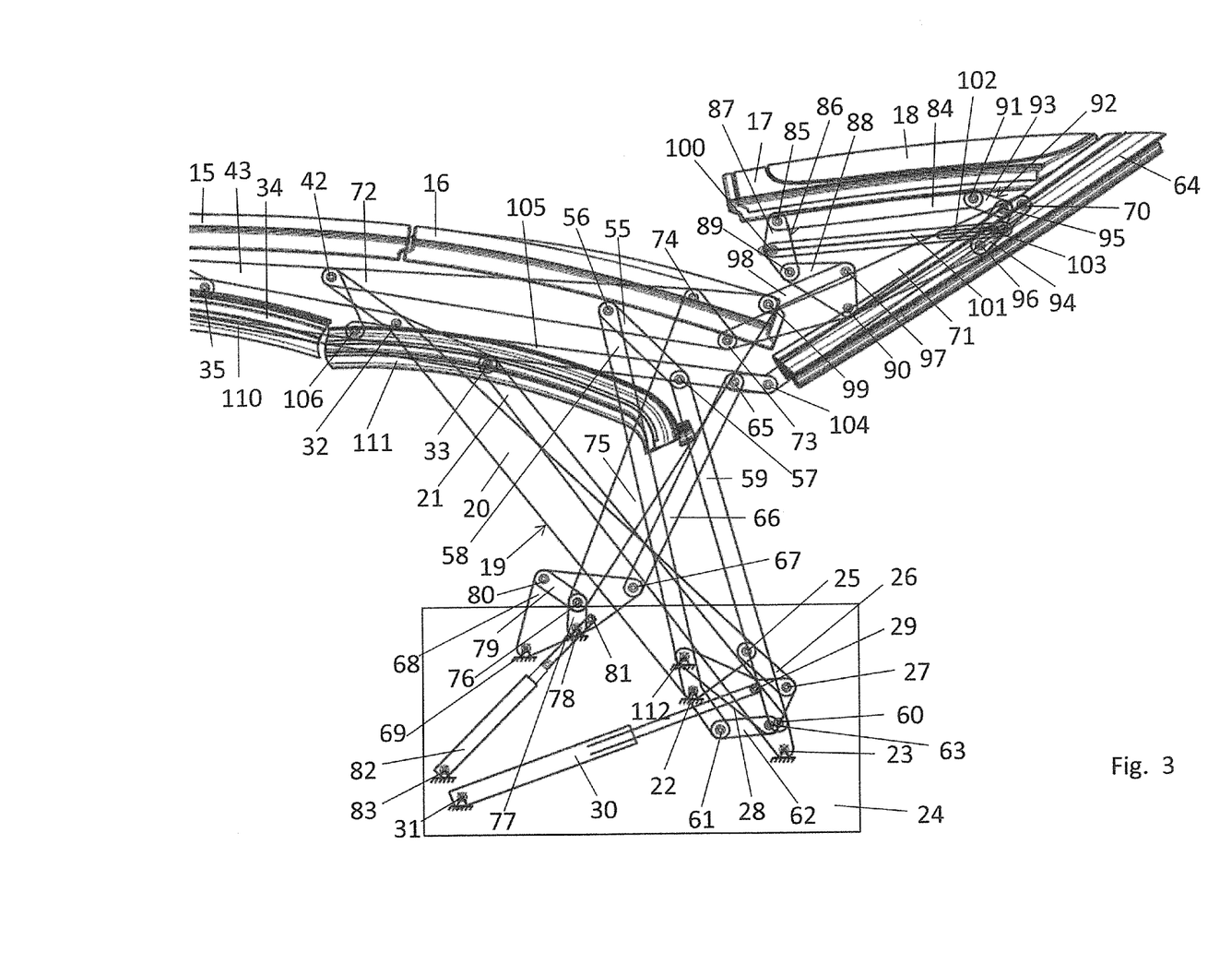
FIG. 3 shows an enlarged view of area III in FIG. 2.
Figure 4:
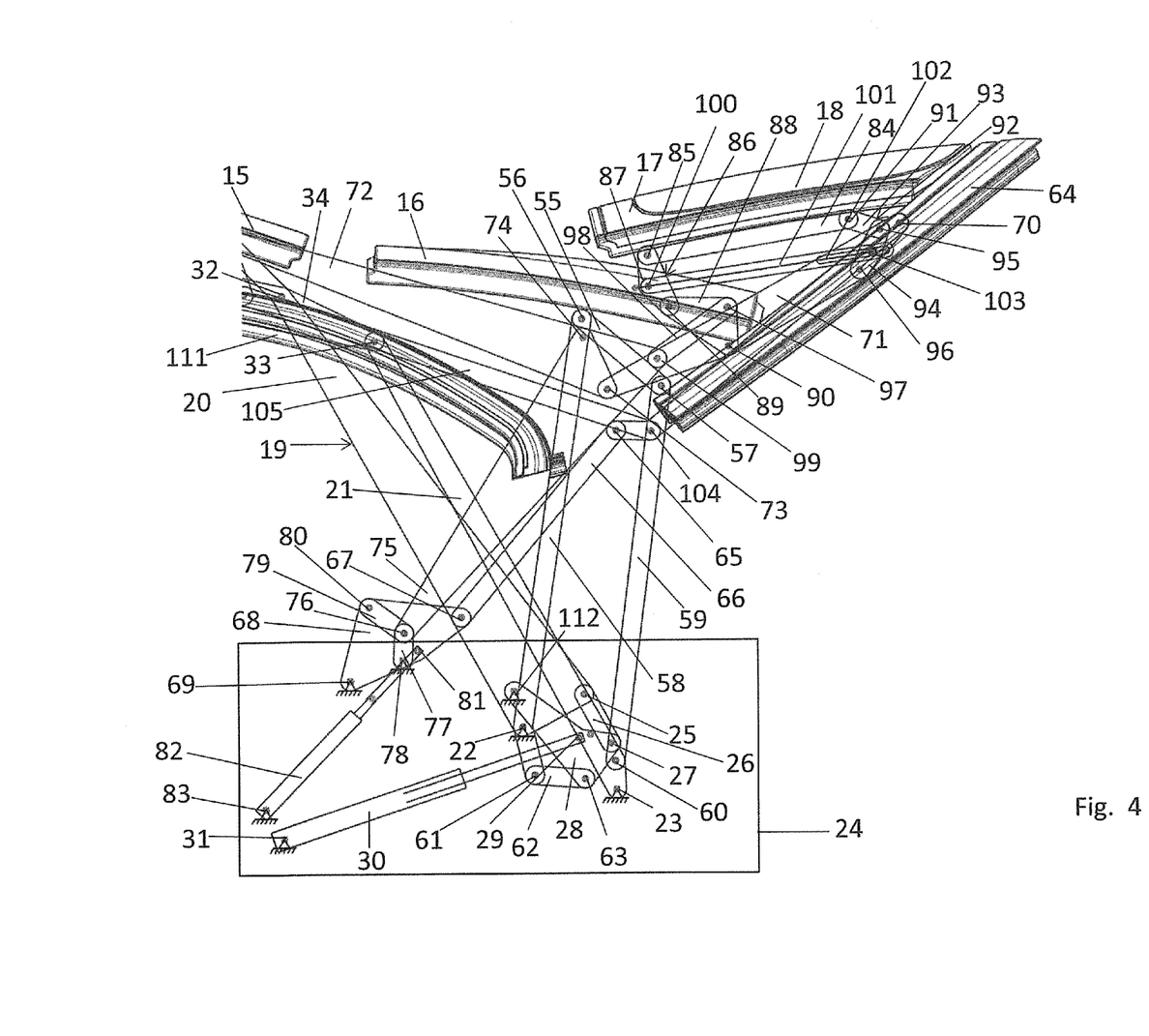
FIG. 4 shows a schematic side view of a rear section of the top according to FIG. 1 in a second intermediate position.
Figure 5:
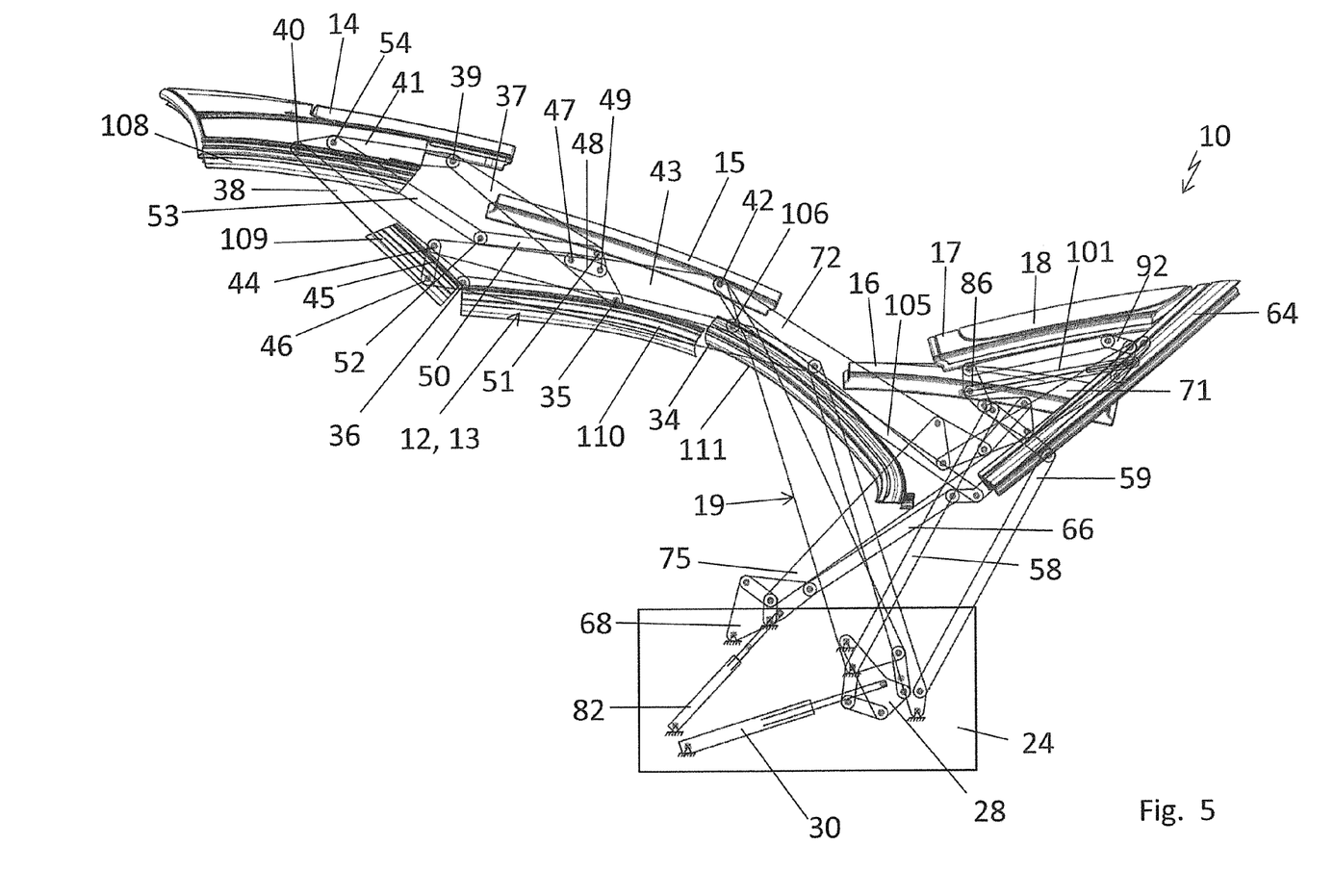
FIG. 5 shows a schematic side view of the top according to FIG. 1 in a third intermediate position.
Figure 8:
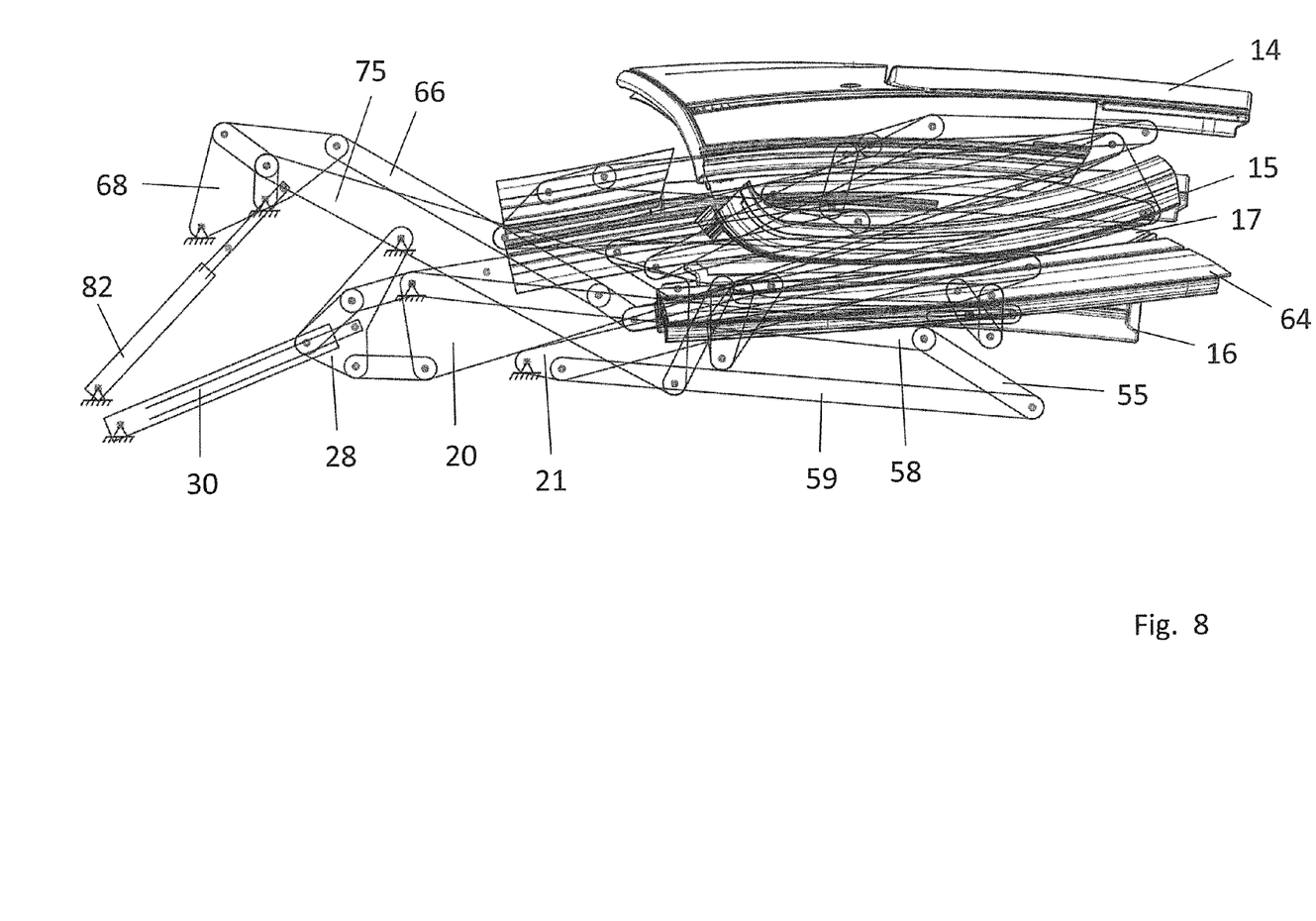
FIG. 8 shows another schematic side view of the top according to FIG. 1, this time in its storage position.

The drawing shows a top 10 realized as a folding top or panel-bow top of a convertible vehicle not illustrated in further detail. The top 10 can be displaced between a closed position, which is illustrated in FIG. 1 and in which an interior of the vehicle is covered, and a storage position, which is illustrated in FIG. 8 and in which the interior of the vehicle is uncovered toward the top. In the storage position, the top 10 is stored in a rear-side top storage box of the vehicle in question.

The top 10 comprises a top cover 11, which is illustrated by dashes in FIG. 1 and made of a foldable water-proof fabric. For stretching the top cover 12, the top 10 comprises a top linkage 12 which comprises a linkage arrangement 13 arranged on both sides with respect to a vertical longitudinal center plane of the top. The bilaterally arranged linkage arrangements 13 are mirror-symmetrical to each other with respect to the vertical longitudinal center plane of the top, which is why the following description of the top 10 will refer only to the linkage arrangement that is arranged on the left side with respect to the direction of forward travel of the vehicle in question. The linkage arrangement arranged on the right side with respect to the direction of forward travel of the vehicle is designed correspondingly; hence, it is apparent from the following description as well.

In the drawing, links and levers that are located in different planes, i.e. behind or next to one another, are all projected into the drawing plane, which is why they may intersect one another in the drawing.

The linkage arrangements 13 serve to actuate four panel bows 14, 15, 16 and 17, which are realized in the fashion of rigid roof shells and form a support surface for the top cover 11 in the closed position illustrated in FIG. 1, said support surface being substantially continuous in the longitudinal direction of the vehicle. In the closed position, the four panel bows 14, 15, 16 and 17 are arranged one behind the other in the longitudinal direction of the top, panel bow 14 forming a front bow, which can be fixed to a front header of the vehicle in question, panel bow 15 forming a front center bow, whose front edge is adjacent to the front bow, panel bow 16 forming a rear center bow, whose front edge is adjacent to the front center bow, and panel bow 17 forming a rear bow, which accommodates a rear window 18. In the storage position, which is illustrated in FIG. 8, the panel bows 14, 15, 16 and 17 are arranged one on top of the other in a stack, the panel bow 14 forming the front bow being arranged on top, followed by the panel bow 15 forming the front center bow, the latter followed by the panel bow 17 forming the rear window bow and by panel bow 16 forming the rear center bow and being arranged at the bottom.

The top cover 11 is fixed to the upper side of panel bow 14, to the rear edge portion of panel bow 15 and to the front edge portion of panel bow 17. The top cover 11 is not fixed to panel bow 16. Instead, it rests loosely, i.e. without fixation, on panel bow 16 when the top is in the closed position.

The linkage arrangements 13 each comprise a main four joint 19, which forms a main multi joint arrangement and has a first main link 20 and a second main link 21. The two main links 20 and 21 are each mounted on a main bearing 24, which is fixed to the vehicle, via a revolute joint 22 and 23, respectively.

For being driven, the main link 20 is connected to a lowering lever 26 via a hinge point 25, lowering level 26 being articulated to a coupling lever 28 via a hinge point 27, a piston rod of a hydraulic cylinder 30 being articulated to coupling lever 28 via a hinge point 29, hydraulic cylinder 30 forming the main drive and being pivotably mounted on main bearing 24 in a support point 31.

The two main links 20 and 21 are connected to a center roof link 34, which is part of a center roof-frame element, via hinge points 32 and 33.

Two front links 37 and 38 are articulated to center roof link 34 via revolute joints 35 and 36 in a center section and a front-side section, respectively, the panel bow 14 forming the front bow being mounted on the ends of the two front links 37 and 38 that face away from revolute joints 35 and 36 via revolute joints 39 and 40. Revolute joints 39 and 40 are formed on a support element 41 of panel bow 14. To be able to pivot the two front links 37 and 38 in relation to center roof link 34, a coupling rod 43 is articulated to main link 20 via a hinge point 42, coupling rod 39 being connected to a coupling link 45 via a pivot joint 44 on the one hand, the end of coupling link 43 that faces away from revolute joint 44 being articulated to front link 38 via a revolute joint 46. On the other hand, coupling rod 43 is connected to a coupling link 48 via a revolute joint 47, coupling link 48 being articulated to front link 37 in a revolute joint 49.

The panel bow 15 forming the front center bow has a support element 50 connected thereto in a torque-proof manner. On the carrier element 50 of panel bow 15, a revolute joint 51 is formed, via which panel bow 15 is pivotably mounted on front link 37. Furthermore, a front revolute joint 52 is formed on support element 50 of panel bow 15, via which a drive lever 53 is articulated to panel bow 15. The end of drive lever 53 that faces away from revolute joint 52 is articulated to support element 41 of the front panel bow 14 or front bow via a hinge point 54.

The panel bow 16 forming the rear center bow has a support element 55 that is connected thereto in a torque-proof manner and has a front hinge point 56 and a rear hinge point 57 via which a front displacing link 58 and a rear displacing link 59 are articulated thereto, which serve to displace panel bow 16. Front displacing link 58 is pivotably mounted on main bearing 24 in revolute joint 22. Rear displacing link 59 is pivotably mounted on main link 21 in a revolute joint 60, main link 21 being mounted on main bearing 24 in revolute joint 23. Front displacing link 58 is connected to a drive lever 62 via a hinge point 61, the end of drive lever 62 that faces away from hinge point 61 being articulated via a revolute joint 63 to coupling lever 28, which is acted on by hydraulic cylinder 30. Thus, front displacing link 58 is the driven displacing link.

The top 10 further comprises a rear-side tension bow 64, which limits the top cover 11 at the rear in the closed position of the top 10 and can come to rest on a top storage box lid in the conventional way. To be able to open the top storage box lid starting from the closed position of the top 10, the tension bow 64 has to be lifted, whereupon the top 10 can be stored in the top storage box.

The tension bow 64, which has a curved shape, is connected on both sides at its front ends to a steering link 66 via a revolute joint 65, steering link 66 being supported with its end facing away from revolute joint 65 on a drive lever 68 via a revolute joint 67, drive lever 68 being pivotably mounted in a revolute joint 69 on main bearing 24. A tension rod arrangement is articulated to both sides of the tension bow 64 via a respective hinge point 70, each tension rod arrangement being formed by a rear tension rod 71 and a front tension rod 72, which is movably connected to rear tension rod 71 in a hinge point 73 and articulated to coupling rod 43 via hinge point 42 at the end facing away from hinge point 73.

To be able to lift and lower the tension bow 64 by means of the tension rod arrangement, the front tension rod 72 is connected to an actuating link 75 in a hinge point 74, actuating link 75 being articulated to a control-lever arrangement in a revolute joint 76, the control-lever arrangement consisting of a first control lever 77, which is pivotably mounted on the main bearing 24 in a revolute joint 78, and a second control lever 79, which is articulated to drive lever 68 via a hinge point 80. The two control levers 77 and 79 are connected to each other in revolute joint 76.

A hydraulic cylinder 82, which is supported on main bearing 24 in a revolute joint 83, is articulated to drive lever 68 in a hinge point 81. By being driven by hydraulic cylinder 82, drive lever 68 can be pivoted about revolute joint 69, whereby the tension rod arrangement is driven via the control-lever arrangement consisting of control levers 77 and 79 and via actuating link 75. In the closed position, which is illustrated in FIG. 1, control levers 77 and 79 take up an over-center position, the tension bow 64 thus being secured against unintentional lifting. Instead, a corresponding lifting force on the tension bow 64 acts on the control-lever arrangement via the tension rod arrangement and the actuating link 75 in such a manner that a torque acts on drive lever 68 in the closing direction, i.e. in the clockwise sense about revolute joint 69 in the drawing.

Rear panel bow 17, which forms the rear window bow, has a support element 84 connected thereto in a torque-free manner and connected to a front folding lever 86 in a hinge point 85, folding lever 86 consisting of a lever 87 and a lever 88, which are connected to each other via a hinge point 89. At the end facing away from hinge point 85, folding lever 86 is pivotably mounted on the rear tension rod 71 via a hinge point 90. On support element 84, another hinge point 91 is formed, via which a rear folding lever 92 is articulated thereto, which consists of a lever 93 and a lever 94, which are connected to each other via a hinge point 95. At its end facing away from hinge point 91, folding lever 92 is pivotably mounted on rear tension rod 71 via a hinge point 96.

To be able to drive the rear link arrangement comprising the two folding levers 86 and 92, lever 88 of folding lever 86 is connected to a drive lever 98 via a hinge point 97, drive lever 98 being articulated to actuating link 75 via a hinge point 99.

To couple the two folding levers 86 and 92, a steering rod 101 is articulated to lever 87 of folding lever 86 via a joint 100, steering rod 101 having a long hole 102 at its end facing away from joint 100, a steering pin 103 arranged on lever 94 of folding lever 92 engaging into long hole 102.

A roof rear link 105 is articulated to tension bow 64 via a hinge point 104 in the area of the bilaterally arranged front ends of tension bow 64, roof rear link 105 being articulated to coupling rod 43 via a hinge point 106 at its end facing away from hinge point 104.

Furthermore, a weather-strip arrangement 107 is connected to the top linkage 12 on both sides, each weather-strip arrangement cooperating with side windows of the vehicle in question when the top is in the closed position and being formed by four weather-strip sections 108, 109, 110 and 111, which are flush with each other in the closed position, which is illustrated in FIG. 1. Weather-strip section 108 is fixed to front bow 14. Weather-strip section 109 is fixed to forward front link 38. Weather-strip section 110 is fixed to roof center link 34, and weather-strip section 111 is fixed to roof rear link 105.

The panel-bow top 10 described above works in the manner described below.

To open the vehicle interior starting form the closed position illustrated in FIG. 1, hydraulic cylinder 82 is actuated first, drive lever 68 thus being pivoted in the counterclockwise sense in the orientation selected in the drawing. In doing so, tension bow 64 is lifted together with rear window bow 17 via steering link 66, on the one hand, and a pulling force is exerted on the tension rod arrangement consisting of tension rods 71 and 72 via control levers 77 and 79 and actuating link 75, on the other hand, tension bow 64 thus being pivoted upward together with rear window bow 17 about revolute joint 65. At the same time, a pushing force is exerted on folding lever 86 via drive lever 98, which puts folding lever 86 in its stretched position. Thus, rear window bow 17 is pivoted upward in relation to rear tension rod 71. In doing so, steering rod 101 is displaced in the direction of folding lever 92 in such a manner that steering pin 103 is displaced from its end stop in long hole 102 in the direction of hinge point 89 and the position of rear window bow 17 in relation to tension rod 71 as defined by steering rod 101 is no longer secured. Moreover, actuation of steering link 66 causes roof rear link 105, which is a weather-strip link, to be lifted together with weather-strip section 111, which is why the pivoting motion of tension bow 64 can be kept smaller compared to known tension-bow tops in order to clear the motion path for a top storage box lid. This also reduces the time required to actuate the top.

As soon as the upper end position of the structural unit formed by tension bow 64 and rear window bow 17 has been reached, drive lever 68 is kept in position, turning it into a fixed bearing for steering link 66 and, via control levers 77 and 79 kept in position as well, for actuating link 75 in the course of the further displacement process.

Once the top storage box of the vehicle in question is subsequently opened by pivoting the top storage box lid, the hydraulic cylinder 30 is actuated, coupling link 28 thus being pivoted clockwise on main bearing 24 about its revolute joint 112 and a drive force being exerted on displacing link 58 via drive lever 62 and on main link 20 of main four-joint 19 via lowering lever 26. By pivoting displacing links 58 and 59, which form a four-joint, rear center bow 16 is pivoted under rear window bow 17. By actuating main four-joint 19, front bow 14 is lifted and pivoted in relation to roof center link 34 in the rearward direction via coupling rod 43 and front links 37 and 38. The pivoting operation causes front center bow 15 to be pivoted in a defined manner about revolute joint 49 on front link 37 via drive lever 53.

Figure 6:
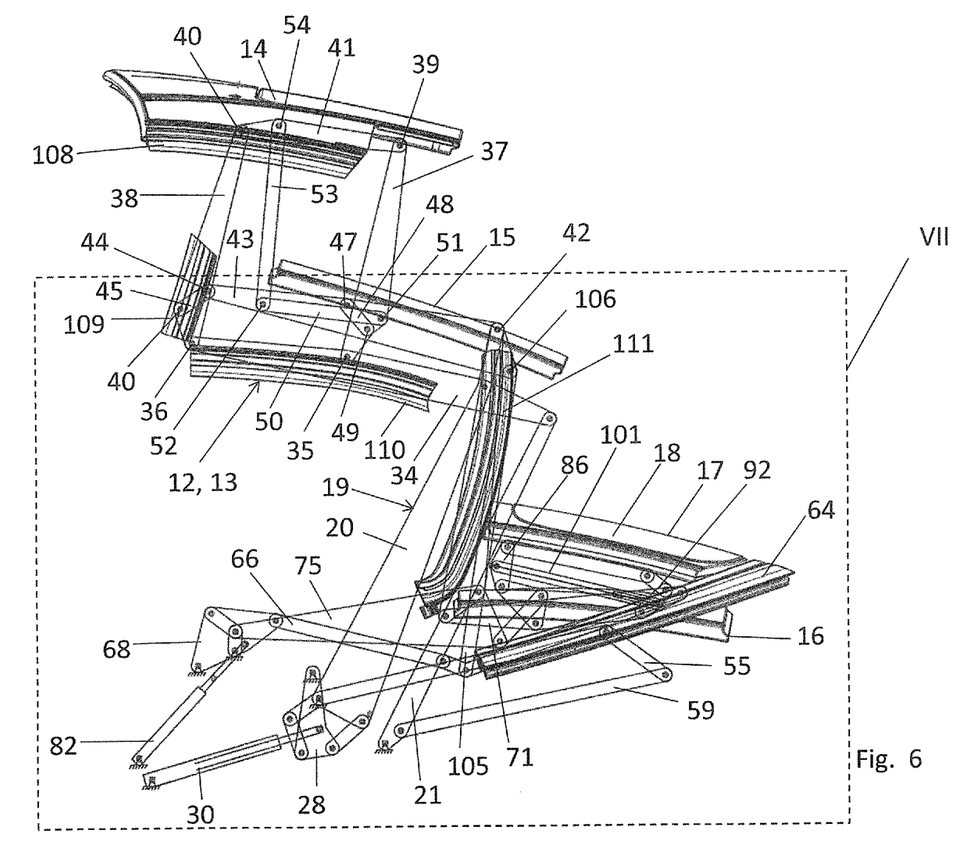
FIG. 6 shows a schematic side view of the top according to FIG. 1 in a fourth intermediate position.
Figure 7:
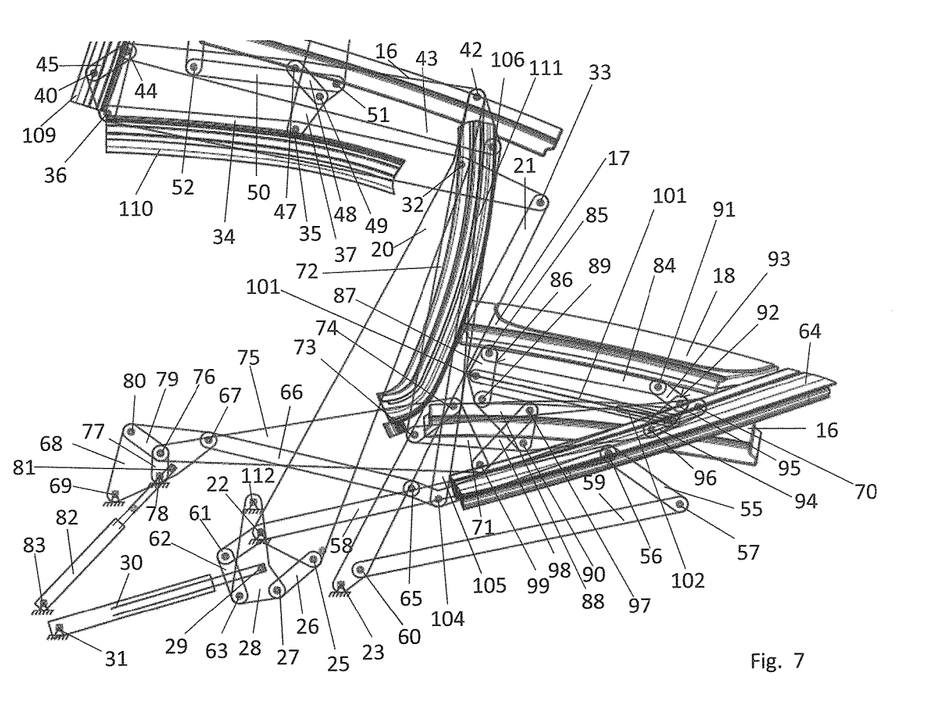
FIG. 7 shows an enlarged view of area VII in FIG. 6.

By continued pivoting of main links 20 and 21 in the rearward, i.e. clockwise direction, actuating link 75 and steering link 66, too, are pivoted clockwise about revolute joints 76 and 67, causing the unit formed by tension bow 64 and rear window bow 17 to be lowered and the latter to be pivoted in the direction of tension bow 64 and a displacing force to be exerted on folding lever 86 via drive lever 98, said displacing force being transmitted to rear folding lever 92 via steering rod 101. Rear center bow 16 is arranged below rear window bow 17 (cf. FIGS. 6 to 8). In contrast to known tops, tension bow 64 is not brought into a lowered intermediate position by means of a tension-bow drive prior to actuation of the main four-joint.

When they are stored in the top storage box, panel bows 14, 15, 16, and 17 are arranged in a stack in the top storage box, as is illustrated by FIG. 8. In the storage position, panel bow 16 forms the bottom panel bow, which is covered by panel bow 17, which forms the rear window bow and which, in turn, is covered by panel bow 15, which forms the front center bow and which is covered by panel bow 14, which forms the front bow.

The top 10 is displaced from the storage position illustrated in FIG. 8 into the closed position illustrated in FIG. 1 in the kinematically reverse manner.

The invention claimed is:

1. A top of a convertible vehicle, comprising a foldable top cover and a top linkage which can be displaced between a closed position, in which a vehicle interior is covered, and a storage position, in which the vehicle interior is open toward the top, and which has a linkage arrangement on both sides with respect to a vertical longitudinal center plane of the top, each linkage arrangement comprising two main links, which are pivotably mounted on a main bearing fixed to the vehicle and one of which is driven by means of a main drive, panel bows extending between the bilaterally arranged linkage arrangements, a first one of said panel bows being a front bow, a second one being a front center bow, a third one being a rear center bow and a fourth one being a rear window bow, characterized in that a rear center bow is arranged below the rear window bow in the storage position and in that two displacing links are articulated to the rear center bow, one of which is driven by means of a drive element and preferably at least one of which is pivotably mounted on the main bearing, and wherein in the closed position of the top, the panel bows form an at least largely continuous support surface for the top cover in the longitudinal direction of the top and the top cover rests on at least one of the center bows without fixation in the closed position.

2. The top according to claim 1, wherein by a coupling lever which is connected to the drive element and to which a drive lever for the driven displacing link of the rear center bow and a lowering lever are articulated, the lowering lever being connected to the driven main link.

3. The top according to claim 2, wherein the coupling link is pivotably mounted on the main bearing.

4. The top according to claim 1, wherein one of the displacing links is pivotably supported on one of the main links via a revolute joint.

5. The top according to claim 1, wherein the rear window bow is connected on both sides to a respective drive means via a respective rear window link arrangement so that when the top is being displaced from the closed position into the storage position, the rear window bow undergoes a lifting motion first, followed by a displacing motion of the rear center bow under the rear window bow.

6. A top of a convertible vehicle, comprising a foldable top cover and a top linkage which can be displaced between a closed position, in which a vehicle interior is covered, and a storage position, in which the vehicle interior is open toward the top, and which has a linkage arrangement on both sides with respect to a vertical longitudinal center plane of the top, each linkage arrangement comprising two main links, which are pivotably mounted on a main bearing fixed to the vehicle and one of which is driven by means of a main drive, panel bows extending between the bilaterally arranged linkage arrangements, a first one of said panel bows being a front bow, a second one being a front center bow, a third one being a rear center bow and a fourth one being a rear window bow, characterized in that a tension bow is arranged between the bilaterally arranged linkage arrangements, which limits the top cover at the rear in the closed position and is displaceable between a lowered position and a lifted position by means of a tension rod arrangement, and in that the tension rod arrangement is connected to an actuating link, which can be driven by a drive means and via which a drive lever is connected to a rear window link arrangement, and in that, by means of the actuating link, the rear window bow undergoes a displacing motion in the direction of the tension bow via the drive lever when the top is being displaced from the closed position into the storage position, and wherein in the closed position of the top, the panel bows form an at least largely continuous support surface for the top cover in the longitudinal direction of the top and the top cover rests on at least one of the center bows without fixation in the closed position.

7. The top according to claim 6, wherein the rear window link arrangement comprises a front folding lever and a rear folding lever, which are supported on the tension rod arrangement or on the tension bow and articulated to the rear window bow.

8. The top according to claim 7, wherein the two folding levers are connected via a steering rod, which is articulated to one of the folding levers via a fixed hinge point and to the other one of the folding levers via a long-hole arrangement.

9. The top according to claim 6, wherein the tension bow is articulated to a steering link on both sides, each steering link being connected to a drive lever which is driven by the drive means for the actuating link.

10. A top of a convertible vehicle, comprising a top cover and a top linkage which can be displaced between a closed position, in which a vehicle interior is covered, and a storage position, in which the vehicle interior is open toward the top, and which has a linkage arrangement on both sides with respect to a vertical longitudinal center plane of the top, each linkage arrangement comprising two main links, which are pivotably mounted on a main bearing fixed to the vehicle and one of which is driven by means of a main drive, panel bows extending between the bilaterally arranged linkage arrangements, a first one of said panel bows being a front bow, a second one being a front center bow, a third one being a rear center bow and a fourth one being a rear window bow, characterized in that a tension bow is arranged between the bilaterally arranged linkage arrangements, which limits the top cover at the rear in the closed position and is displaceable between a lowered position and a lifted position by means of a tension rod arrangement, and in that the tension rod arrangement is connected to an actuating link, which can be driven by a drive means and via which a drive lever is connected to a rear window link arrangement, and in that, by means of the actuating link, the rear window bow undergoes a displacing motion in the direction of the tension bow via the drive lever when the top is being displaced from the closed position into the storage position,
    wherein the tension bow is articulated to a steering link on both sides, each steering link being connected to a drive lever which is driven by the drive means for the actuating link, and,
    wherein a roof rear link is articulated to the tension bow or to the steering link, said roof rear link being connected via a hinge point to a coupling rod for actuating the front bow, and a rear-side weather-strip section of a side weather strip of the top being preferably fixed to the roof rear link.

11. The top according to claim 6, wherein the main drive and the drive means for the tension rod arrangement are formed by separate control elements.

12. The top according to claim 6, wherein actuation of the main drive and actuation of the drive means for the tension rod arrangement take place successively when the top is being displaced between the closed position and the storage position.

13. A top of a convertible vehicle, comprising a foldable top cover and a top linkage which can be displaced between a closed position, in which a vehicle interior is covered, and a storage position, in which the vehicle interior is open toward the top, and which has a linkage arrangement on both sides with respect to a vertical longitudinal center plane of the top, each linkage arrangement comprising two main links, which are pivotably mounted on a main bearing fixed to the vehicle and one of which is driven by means of a main drive, panel bows extending between the bilaterally arranged linkage arrangements, a first one of said panel bows being a front bow, a second one being a front center bow, a third one being a rear center bow and a fourth one being a rear window bow, the front bow being connected to a roof center link via two front links, the roof center link being connected to the two main links in an articulated manner, characterized in that the front center bow is pivotably mounted on one of the two front links and connected to a drive lever which is articulated to the front bow via a hinge point.

14. A top of a convertible vehicle, comprising a top cover and a top linkage which can be displaced between a closed position, in which a vehicle interior is covered, and a storage position, in which the vehicle interior is open toward the top, the top linkage comprising a rear-side tension bow, which limits the top cover at the rear in the closed position, and comprising a linkage arrangement on both sides with respect to a vertical longitudinal center plane of the top, each linkage arrangement comprising two main links, which are pivotably mounted on a main bearing fixed to the vehicle and one of which is driven by means of a main drive, and a side weather strip of the top, which cooperates with a lateral window arrangement of the convertible vehicle in the closed position and has at least one rear-side weather-strip section which is attached to a weather-strip link of the respective linkage arrangement, characterized in that the weather-strip link undergoes a lifting motion together with the tension bow when the top linkage is being displaced from the closed position into the storage position.

15. The top according to claim 14, wherein the weather-strip link is a roof rear link which is articulated via its front-side end to a coupling link for actuating a front bow.

16. The top according to claim 14, wherein the tension bow is articulated to the bilaterally arranged weather-strip links.

17. The top according to claim 14, wherein each linkage arrangement comprises a steering link which causes the lifting motion of the respective weather-strip link and of the respective tension bow.

18. The top according to claim 17, wherein the steering link is articulated to the weather-strip link.

19. The top according to claim 16, wherein the steering link is connected to a drive lever which is driven by a drive means and preferably pivotably articulated to the main bearing fixed to the vehicle.

20. The top according to claim 19, wherein an actuating link is articulated to the drive lever, said actuating link being connected to a tension rod arrangement by means of which the tension bow can be pivoted relative to the weather-strip link.

21. The top according to claim 20, wherein the actuating link is articulated to the drive lever via a control-lever arrangement.

22. The top according to claim 19, wherein the main drive and the drive means are formed by separate control elements.

23. The top according to claim 14, wherein panel bows extend between the bilaterally arranged linkage arrangements, a first one of said panel bows being a front bow, a second one being a front center bow, a third one being a rear center bow and a fourth one being a rear window bow.

* * * * *